United States Patent
Knipfer et al.

(10) Patent No.: US 8,010,217 B2
(45) Date of Patent: Aug. 30, 2011

(54) RECONFIGURATION OF ASSETS FOR REUSE DURING MANUFACTURING

(75) Inventors: Ivory W. Knipfer, Rochester, MN (US); Jason S. Lee, Oronoco, MN (US); Francis E. del Rosario, Rochester, MN (US); Antoine G. Sater, Rochester, MN (US); Hao H. Xu, Shenzhen (CN); Hui Zhang, Shenzhen (CN)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 12/180,578

(22) Filed: Jul. 28, 2008

(65) Prior Publication Data

US 2010/0023147 A1 Jan. 28, 2010

(51) Int. Cl.
- *G05B 19/42* (2006.01)
- *G06F 19/00* (2006.01)
- *G06Q 30/00* (2006.01)
- *G06Q 10/00* (2006.01)

(52) U.S. Cl. ............ 700/103; 700/86; 700/95; 700/97; 700/105; 700/110; 700/117; 705/26.81; 705/28

(58) Field of Classification Search .................. 700/86, 700/95, 103, 105, 110, 117, 97; 705/28, 705/26.81

See application file for complete search history.

(56) References Cited

U.S. PATENT DOCUMENTS

| | | | | |
|---|---|---|---|---|
| 4,796,194 A | * | 1/1989 | Atherton | 700/103 |
| 4,827,423 A | * | 5/1989 | Beasley et al. | 700/96 |
| 5,260,866 A | * | 11/1993 | Lisinski et al. | 705/29 |
| 5,463,555 A | * | 10/1995 | Ward et al. | 700/96 |
| 5,983,195 A | * | 11/1999 | Fierro | 705/10 |
| 6,560,501 B1 | * | 5/2003 | Walser et al. | 700/99 |
| 6,836,689 B2 | * | 12/2004 | Walser et al. | 700/100 |
| 6,871,110 B1 | | 3/2005 | Yen et al. | |
| 7,013,189 B2 | * | 3/2006 | Weber | 700/97 |
| 7,333,870 B2 | * | 2/2008 | Knipfer et al. | 700/105 |
| 7,398,492 B2 | * | 7/2008 | Youngman et al. | 716/5 |

(Continued)

OTHER PUBLICATIONS

Bagchi et al., "Experience Using the IBM Supply Chain Simulator", 1998, Winter Simulation Conference, 8 pages.*

(Continued)

*Primary Examiner* — Ramesh B Patel
*Assistant Examiner* — Thomas Stevens
(74) *Attorney, Agent, or Firm* — Steven M. Greenberg, Esq.; Carey, Rodriguez, Greenberg & Paul

(57) ABSTRACT

A method for reconfiguring a partially manufactured product for a canceled custom-built order during a manufacturing process includes canceling a custom-built order for a product that has been partially manufactured. The method also includes reading a configuration of the partially manufactured product for the custom-built order that has been canceled, and reading at least one order for a different manufactured product, wherein each order is associated with a target configuration. The method yet further includes reading a set of rules that match a given configuration with one of a set of target configurations and executing the set of rules upon the configuration of the partially manufactured product so as to match the configuration of the partially manufactured product with one of a target configuration of the at least one order. Finally, the method includes initiating re-configuration of the partially manufactured product to the target configuration with which it was matched to produce the different manufactured product corresponding to the at least one order in lieu of the custom-built order that had been canceled.

19 Claims, 9 Drawing Sheets

U.S. PATENT DOCUMENTS

| | | | |
|---|---|---|---|
| 7,437,205 B2 * | 10/2008 | Knipfer et al. | 700/106 |
| 7,840,441 B2 * | 11/2010 | Erickson et al. | 705/26.81 |
| 2001/0016803 A1 * | 8/2001 | Sartiono et al. | 703/1 |
| 2002/0032495 A1 * | 3/2002 | Ozaki | 700/108 |
| 2002/0083026 A1 * | 6/2002 | Eshelman et al. | 706/14 |
| 2002/0188367 A1 * | 12/2002 | Hayashi | 700/110 |
| 2003/0181997 A1 * | 9/2003 | Weber | 700/28 |
| 2003/0233160 A1 * | 12/2003 | Ishida | 700/106 |
| 2004/0098155 A1 * | 5/2004 | Walser et al. | 700/100 |
| 2004/0220688 A1 * | 11/2004 | Behrisch et al. | 700/96 |
| 2005/0222885 A1 * | 10/2005 | Chen et al. | 705/8 |
| 2006/0085296 A1 | 4/2006 | Strickland | |
| 2006/0190291 A1 | 8/2006 | Erickson et al. | |
| 2006/0235561 A1 * | 10/2006 | Lopez | 700/117 |
| 2006/0271218 A1 * | 11/2006 | Lopez et al. | 700/97 |
| 2007/0288112 A1 * | 12/2007 | Knipfer et al. | 700/105 |
| 2007/0299730 A1 | 12/2007 | Erickson et al. | |
| 2009/0299882 A1 * | 12/2009 | Erickson et al. | 705/28 |

OTHER PUBLICATIONS

Pan et al., "A Comparitive Study of Orer Batching Algorithms", 1994, Pergamon, 10 pages.*

Lu et al; "Order Fill Rate, Leadtime Variability, and Advance Demand Information in an Assemble-to-Order System"; Operations Research; vol. 51; No. 2; pp. 292-308; 2003.

Cheng et al.; "Inventory-Service Optimization in Configure-to-Order Systems"; Manufacturing and Service Operations Management; vol. 4; No. 2; pp. 114-132; 2002.

* cited by examiner

| Key Name | Match Key | | | | | | Active? | Relative Priority | System or Unit Level? |
|---|---|---|---|---|---|---|---|---|---|
| | "FROM" Configuration | "FROM" Machine Type | "From" Model | "TO" Configuration | "TO" Machine Type | "TO" Model | | | |
| A | PN 123456 | NA | NA | PN123457 | NA | NA | | 0050 | |
| B | SEO B | NA | NA | SEO A | *ALL | *ALL | Y | 0050 | S |
| C | SEO A | NA | NA | "CTO" | 940*, 9117 | 570, MMA | Y | 0100 | S |
| D | "CTO" | 9406 | 520A | "CTO" | 9406 | 520 | Y | 1000 | SU |
| E | "CTO" | 9117 | *ALL | "CTO" | 9117 | *ALL | Y | 5000 | SU |
| F | SEO 12P1234 | NA | NA | "CTO" | 9117 | *ALL | Y | 1000 | SU |
| G | "CTO" | 9117 | 570 | "CTO" | 9117 | 570 | Y | 0100 | U |

FIG. 3

| Key Name | Match Key | | | | | | Asset Sort Priority | | | | | | Non-prioritized Asset Disposition |
|---|---|---|---|---|---|---|---|---|---|---|---|---|---|
| | "FROM" Configuration | "FROM" Machine Type | "FROM" Model | "TO" Configuration | "TO" Machine Type | "TO" Model | Age Sort | Fore-cast dmd? | Short Rep Ck? | Stocked @ location | Shift | | |
| A | PN 123456 | NA | NA | PN123457 | NA | NA | F | N | N | FL0001, FL0002 | 1 | *EXCLUDE |
| B | SEO B | NA | NA | SEO A | *ALL | *ALL | L | N | N | FL00A | *ALL | *INCLUDE |
| C | SEO A | NA | NA | "CTO" | 940*, 9117 | 570, MMA | F | Y | N | *ALL | *ALL | NA |
| D | "CTO" | 9406 | 520A | "CTO" | 9406 | 520 | NA | NA | Y | CANCEL | 1 | *EXCLUDE |
| E | "CTO" | 9117 | *ALL | "CTO" | 9117 | *ALL | NA | NA | N | *ALL | *ALL | NA |
| F | SEO 12P1234 | NA | NA | "CTO" | 9117 | *ALL | F | N | N | FL00A | 1 | *INCLUDE |
| G | "CTO" | 9117 | 570 | "CTO" | 9117 | 570 | F | N | N | *ALL | *ALL | *INCLUDE |
| | 402 | 404 | 406 | 408 | 410 | 412 | 414 | 416 | 418 | 420 | 422 | 424 |

FIG. 4

| | Match Key | | | | | | From Attributes | | | | | From-To Exclusionary Attribute Combinations | | | To Attributes | |
|---|---|---|---|---|---|---|---|---|---|---|---|---|---|---|---|---|
| Key Name | "FROM" Configuration | "FROM" Machine Type | "From" Model | "TO" Configuration | "TO" Machine Type | "TO" Model | Operational Conditions | Product Qualification | Production Line/Area | Quality Hold | Loaner Status | Language Group | Country | Conditional Use Indicator | Time to Ship | Order Class |
| A | PN 123456 | NA | NA | PN 123457 | NA | NA | Passed OP110 | UL HIPOT tested at Voltage xyz | NA | Y | No Loaner Parts | Korean to any Non-Korean | NA | ROHS | < 2 days | Firm Order |
| B | SEO B | NA | NA | SEO A | *ALL | *ALL | Passed Op 120, 130, and 140 | UL HIPOT | HE Build / Building 105 | N | No Loaner Parts | US English | USA | ROHS | 05/12/07 – 05/31/07 | Soft Order |
| C | SEO A | NA | NA | "CTO" | 940*; 9117 | 570, MMA | Did not execute Op 155 burn in personalization | VCCI | Mid Range | Y | Yes | Japanese | Japan | No-ROHS | < 10 days | Pend |
| D | "CTO" | 9406 | 520A | "CTO" | 9406 | 520 | Pack | NOM | Entry Level | N | Yes | Mexican | Mexico | ROHS | < 1 day | R |
| E | "CTO" | 9117 | *ALL | "CTO" | 9117 | *ALL | Passed OP 170 | Quality Inspection | Mid Range / 5F pack. | N | No Loaner Parts | Arabic | Lebanon | ROHS | < 3 days | C |
| F | SEO 12P1234 | NA | NA | "CTO" | 9117 | *ALL | Passed Op 120, 130, and 140 | CCC | NA | N | No Loaner Parts | Chinese | China | ROHS | < 4 days | IPR |
| G | "CTO" | 9117 | 570 | "CTO" | 9117 | 570 | Op 50 | CE | Mid Range | N | Yes | English | Ireland | ROHS | | |
| | 502 | 504 | 506 | 508 | 510 | 512 | 514 | 516 | 518 | 520 | 522 | 524 | 526 | 528 | 530 | 532 |

FIG. 5

| | Match Key | | | | | Optimize From/TO | Sales Content | | Part (Manufacturing) Content | | |
|---|---|---|---|---|---|---|---|---|---|---|---|
| Key Name | "FROM" Configuration | "FROM" Machine Type | "FROM" Model | "TO" Configuration | "TO" Machine Type | "TO" Model | | Sales Validation Req'd? | % Match | Item Validation Req'd? | % Match From/To | % RMV On From |
| A | PN 123456 | NA | NA | PN123457 | NA | NA | T | N | NA | N | 0 | 0 |
| B | SEO B | NA | NA | SEO A | *ALL | *ALL | F | Y | 90 | Y | 90 | 3 |
| C | SEO A | NA | NA | "CTO" | 940*, 9117 | 570, MMA | F | Y | 80 | Y | 80 | 15 |
| D | "CTO" | 9406 | 520A | "CTO" | 9406 | 520 | T | Y | 80 | Y | 65 | 15 |
| E | "CTO" | 9117 | *ALL | "CTO" | 9117 | *ALL | T | Y | 50 | Y | 65 | 20 |
| F | SEO 12P1234 | NA | NA | "CTO" | 9117 | *ALL | T | Y | 80 | Y | 90 | 5 |
| G | "CTO" | 9117 | 570 | "CTO" | 9117 | 570 | T | N | NA | Y | 70 | 20 |

| | Match Key | | | | | | Required | | Excluded | | Required | | | Excluded | | |
|---|---|---|---|---|---|---|---|---|---|---|---|---|---|---|---|---|
| Key Name | "FROM" Configuration | "FROM" Machine Type | "From" Model | "TO" Configuration | "TO" Machine Type | "TO" Model | FCs | Qty | FCs | Qty | BOM | Qty | BOM | Qty |
| D | "CTO" | 9406 | 520A | "CTO" | 9406 | 520 | 0001 | 1 | 5505 | 1 | 42R5617 | | 23L0284 | |
| D | "CTO" | 9406 | 520A | "CTO" | 9406 | 520 | 0050 | 3 | 5405 | 1 | 17G0263 | | | |
| D | "CTO" | 9406 | 520A | "CTO" | 9406 | 520 | 6000 | 2 | | | | | | |
| D | "CTO" | 9406 | 520A | "CTO" | 9406 | 520 | *NONE | | *NONE | | *NONE | | *NONE | |
| E | "CTO" | 9117 | *ALL | "CTO" | 9117 | *ALL | *NONE | | 5217 | 2 | *NONE | | *NONE | |
| E | "CTO" | 9117 | *ALL | "CTO" | 9117 | *ALL | 9147 | 1 | 42* | * | *NONE | | *NONE | |
| E | "CTO" | 9117 | *ALL | "CTO" | 9117 | *ALL | *NONE | | 5512-5516 | 1 | *NONE | | *NONE | |
| 702 | 704 | 706 | 708 | 710 | 712 | 714 | 716 | 718 | 720 | 722 | 724 | 726 | 727 |

| | Match Key | | | | | | Product ID | Part/Commodity Content | | | | | |
|---|---|---|---|---|---|---|---|---|---|---|---|---|---|
| Key Name | "FROM" Configuration | "FROM" Machine Type | "From" Model | "TO" Configuration | "TO" Machine Type | "TO" Model | Product ID | BOM | PN or Commodity | Operation | Placement | ATTRIBUTE Required | Critical Part? |
| D | "CTO" | 9406 | 520A | "CTO" | 9406 | 520 | 1.8M_AS | NA | PN 1 Y | Op 140 | Y | TESTED | Y |
| D | "CTO" | 9406 | 520A | "CTO" | 9406 | 520 | | 123 | PN 2 N | Op 50 | N | N | Y |
| D | "CTO" | 9406 | 520A | "CTO" | 9406 | 520 | | NA | DASD | NA | N | THERMAL | N |
| E | "CTO" | 9117 | *ALL | "CTO" | 9117 | *ALL | 1.8M_RS | NA | ADAPTER | Op 170 | Y | FIRMWARE LEVEL | N |
| E | "CTO" | 9117 | *ALL | "CTO" | 9117 | *ALL | 520DRW | NA | PN 3 | Op 170 | N | NA | Y |
| E | "CTO" | 9117 | *ALL | "CTO" | 9117 | *ALL | *IPR | NA | PN 4 | Op 170 | N | NA | Y |
| E | "CTO" | 9117 | *ALL | "CTO" | 9117 | *ALL | *MES | NA | *ALL | Op 170 | N | TESTED | Y |

802  804  806  808  810  812  814  816  818  820  822  824  826

RECONFIGURATION OF ASSETS FOR REUSE DURING MANUFACTURING

BACKGROUND OF THE INVENTION

1. Field of the Invention

The present invention relates to commercial manufacturing processes, and more particularly to asset reconfiguration management for commercial manufacturing processes.

2. Description of the Related Art

Because of the large amounts of customization selections available to consumers, custom built computer products, such as servers, server systems and database platforms, come in a wide variety of configurations. The variety in the configurations is attributed to the ranges and mixtures of hardware, software and instructional features available to consumers. Due to the potential diversity in custom built computer products, a custom built product can be one of a kind.

Cancellations of custom-built orders are common in the computer manufacturing industry. Often, a cancellation occurs in the middle of the manufacturing process. When this transpires, a manufacturer is left with a unique product (or work unit) in a partially manufactured state. (Note that a work unit refers to an incomplete product undergoing manufacturing wherein the work unit may refer to one part of a larger whole, i.e., an individually build-able portion that will later be integrated into the whole.) Ideally, manufacturers prefer to reuse the partially manufactured product or at least the parts that comprise the work unit. This poses a challenge when dealing with a partially-manufactured custom built product that doesn't fit neatly into the basis or make-up of another product or another configuration of a particular product. There are various conventional approaches to this problem, but each comes with its drawbacks.

One approach to this problem involves completely disassembling the partially-manufactured custom built product into its basic components, which are then re-used in other manufacturing lines. This approach, however, can be labor-intensive and time-consuming. Further, there may be various states of disassembly of the partially-manufactured custom built product that may fit neatly into the manufacturing line of another product. Re-use at this intermediate level would avoid wasted labor and/or time. For this reason, the full disassembly of the partially manufactured custom built product could result in significant wasted labor and/or time, and significantly increased potential for errors or damage.

Another approach to this problem involves setting aside the partially-manufactured custom built product and waiting for another order like the original so as to reuse the work unit. This approach, however, is uncertain and can lead to long waits, increased inventory holding costs and reduced storage space due to storage of the partially-completed work unit. Yet another approach to this problem involves selling the partially-manufactured custom built product. This approach is also uncertain and can lead to long waits, reduced storage space due to storage of the partially-completed work unit and eventual loss of invested time and resources because the partially-completed work unit must often be sold for less than it is worth or at least for less than a completed version of the product.

Thus, there is a need to overcome the deficiencies in the prior art and more particularly for a more efficient way to reconfigure cancelled custom-built products that are partially manufactured.

BRIEF SUMMARY OF THE INVENTION

Embodiments of the present invention address deficiencies of the art in respect to routing and provide a novel and non-obvious method and computer program product for facilitating reconfiguration of partially manufactured products in a manufacturing environment. In an embodiment of the invention, a method for reconfiguring a partially manufactured product during a manufacturing process is disclosed. The method can include reading a configuration of the partially manufactured product and reading at least one order for a manufactured product, wherein each order is associated with a target configuration. The method can further include reading a set of rules that match a given configuration with one of a set of target configurations and executing the set of rules upon the configuration of the partially manufactured product so as to match the configuration of the partially manufactured product with one of a target configuration of the at least one order. The method can further include initiating re-configuration of the partially manufactured product to the target configuration with which it was matched.

In another embodiment of the invention, a computer program product comprising a computer usable medium embodying computer usable program code for reconfiguring a partially manufactured product during a manufacturing process can be provided. The computer program product can include computer usable program code for reading a configuration of the partially manufactured product and reading at least one order for a manufactured product, wherein each order is associated with a target configuration. The computer program product can further include computer usable program code for reading a set of rules that match a given configuration with one of a set of target configurations and executing the set of rules upon the configuration of the partially manufactured product so as to match the configuration of the partially manufactured product with one of a target configuration of the at least one order. The computer program product can further include computer usable program code for initiating re-configuration of the partially manufactured product to the target configuration with which it was matched.

In another embodiment of the invention, an alternative method for reconfiguring a partially manufactured product during a manufacturing process is disclosed. The method can include reading a configuration of the partially manufactured product and a configuration for components of the partially manufactured product and reading at least one order for a manufactured product, wherein each order is associated with a target configuration. The method can further include reading a set of rules that match a given configuration with one of a set of target configurations and executing the set of rules upon the configuration of the partially manufactured product so as to match the configuration of the partially manufactured product with one of a target configuration of the at least one order. The method can further include determining that the configuration of the partially manufactured product does not match one of a target configuration of the at least one order and executing the set of rules upon the configurations of the components of the partially manufactured product so as to match the configurations of the components with one of a target configuration of the at least one order. The method can further include initiating re-configuration of at least one component of the partially manufactured product to the target configuration with which it was matched.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is a chart depicting an example of general rules used in rule set 210, according to one embodiment of the present invention;

FIG. 4 is a chart depicting an example of rules used in rule set 210 to sort work units according to various factors, according to one embodiment of the present invention;

FIG. 5 is a chart depicting an example of rules used in rule set 210 to sort work units according to non-component data, according to one embodiment of the present invention;

FIG. 6 is a chart depicting an example of rules used in rule set 210 to sort work units according to sales data and part content, according to one embodiment of the present invention;

FIG. 7 is a chart depicting an example of rules used in rule set 210 to sort work units according to sales data, according to one embodiment of the present invention;

FIG. 8 is a chart depicting an example of rules used in rule set 210 to sort work units according to manufacturing content, according to one embodiment of the present invention.

DETAILED DESCRIPTION OF THE INVENTION

Embodiments of the present invention address deficiencies of the art in respect to routing and provide a novel and non-obvious method and computer program product for facilitating reconfiguration of partially manufactured products in a manufacturing environment. In an embodiment of the invention, a method for reconfiguring a partially manufactured product, such as a cancelled or returned product, during a manufacturing process is disclosed. The method can include reading a configuration of the partially manufactured product and reading at least one order for a manufactured product, wherein each order is associated with a target configuration. The method can further include reading a set of rules that match a given configuration with one of a set of target configurations and executing the set of rules upon the configuration of the partially manufactured product so as to match the configuration of the partially manufactured product with one of a target configuration of the at least one order. The method can further include initiating re-configuration of the partially manufactured product to the target configuration with which it was matched. Thus, the partially manufactured product is reused in the manufacturing process to fulfill an order it was not originally created to fulfill.

Figure 1:
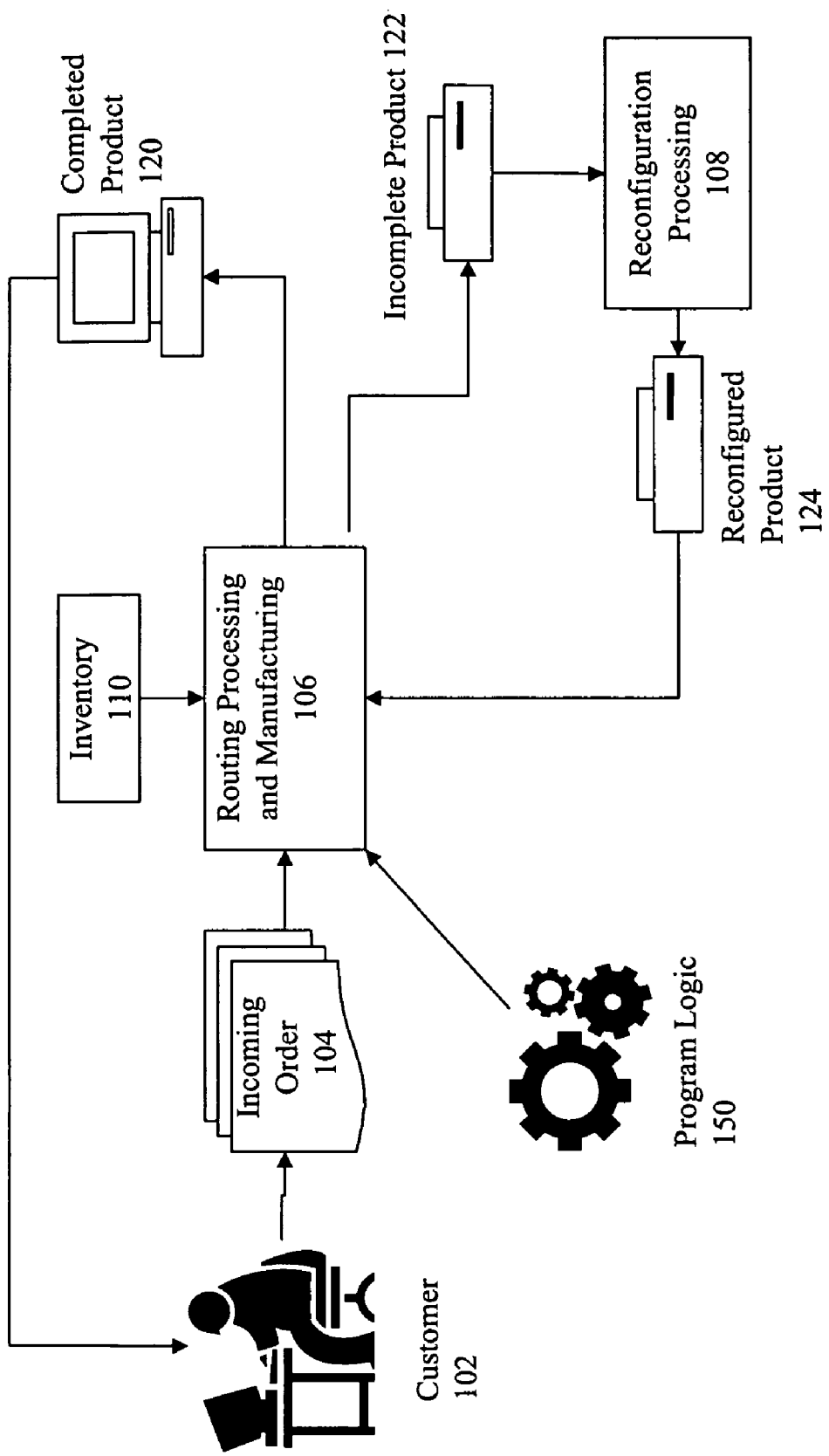
FIG. 1 is an illustration of a manufacturing production network incorporating intelligent reconfiguration processing, according to one embodiment of the present invention.

FIG. 1 is an illustration of a manufacturing production network incorporating intelligent reconfiguration processing, according to one embodiment of the present invention. The process depicted by FIG. 1 begins with a customer 102 placing an order 104 via a web site, telephone or mail. In advanced manufacturing environments where products are "built to customer order," an incoming order 104 can be processed by a mass routing processing and manufacturing system 106 wherein intelligent routing processing can be invoked to enable halting, initiating or resuming manufacturing of certain work units at predefined points. The mass routing processing and manufacturing system 106 draws upon inventory 110, which provides the materials and bases for the products manufactured by process 106.

The mass routing processing and manufacturing system 106 may further include program logic 150 for enabling intelligent reconfiguration of cancelled or returned custom built products in a partially completed state. Program logic 150 comprises computer source code, scripting language code or interpreted language code that is compiled to produce computer instructions that perform various functions of the present invention.

Figure 2:
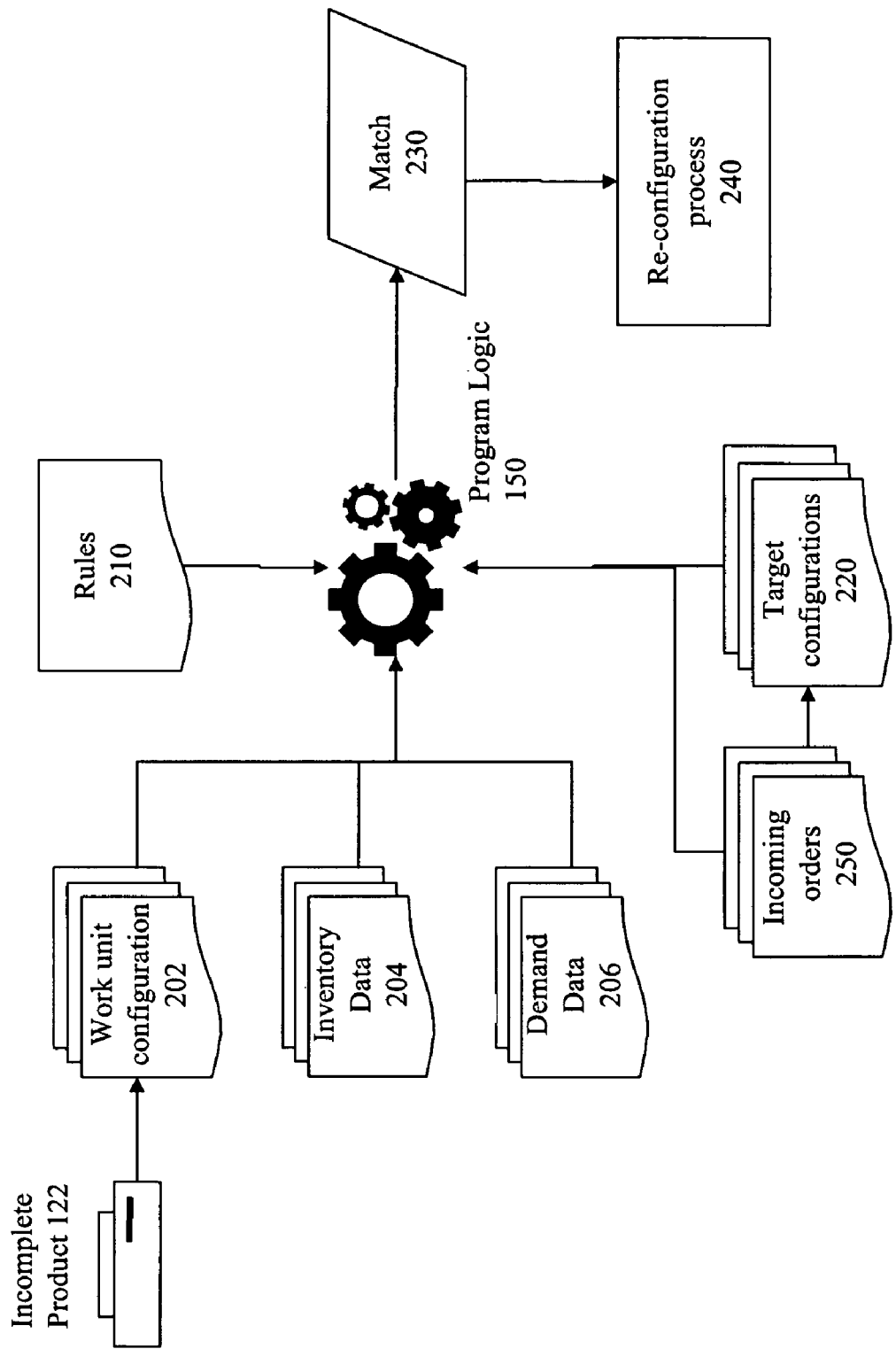
FIG. 2 is a block diagram showing the main input and output elements for a manufacturing production network incorporating intelligent reconfiguration processing, according to one embodiment of the present invention.

Typically, a completed product 120 is produced by the process of FIG. 2 and it can be delivered to the customer 102. In the event of a cancellation of a custom-built order midway through the manufacturing process, the incomplete product or work unit 122 exits the manufacturing process 106. Execution of the program logic 150 enables intelligent reconfiguration of cancelled incomplete product or work unit 122. The work unit 122 is reconfigured by undergoing a reconfiguration process 108, thereby producing one or more reconfigured work units 124, which is/are thereby available to the manufacturing process 106 for fulfill additional orders. Thus, the work unit 122 is re-entered into the manufacturing process 106 via reconfiguration.

FIG. 2 is a block diagram showing the main input and output elements for a manufacturing production network incorporating intelligent reconfiguration processing, according to one embodiment of the present invention. FIG. 2 provides more detail on the method by which program logic 150 enables intelligent reconfiguration of cancelled incomplete product or work unit 122 and re-entry of the work unit 122 into the manufacturing process 106 for fulfillment of incoming orders 250. In one embodiment, a server or computer implements the steps performed by program logic 150.

Program logic 150 reads the configuration data 202 for incomplete product or work unit 122. The configuration data 202 may be provided by a user or may reside on a file that is read by program logic 150. Configuration data may comprise a plurality of configuration items, which refer to one of possibly many configuration settings of a computer or server that together comprise a configuration status. A configuration item comprises a configuration attribute and a related value. Examples of configuration attributes are "product family," "part number" and "description." Each of the aforementioned configuration attributes may have a text string as an attribute value.

Program logic 150 further reads the inventory data 204 for the manufacturing process 106. The inventory data 204 may be provided by a user or may reside on a file that is read by program logic 150. Inventory data refers to data pertaining to current inventory levels, historic inventory levels and projected inventory levels.

Program logic 150 further reads the demand data 206 for the manufacturing process 106. The demand data 206 may be provided by a user or may reside on a file that is read by program logic 150. Demand data refers to data pertaining to current demand and projected or forecasted demand for various items, products or parts.

Program logic 150 further reads the incoming orders 250 and the corresponding target configurations 220 that are derived from the incoming orders 250. That is, each incoming order is associated with a target configuration. The group of target configurations 220 are a list of configurations to which the work unit 122 may be re-configured. The incoming orders 250 and the target configurations 220 may be provided by a user or may reside on a file that is read by program logic 150.

Each target configuration in the target configurations 220 is associated with a description that provides configuration data, which may comprise a plurality of configuration items. A configuration item refers to one of possibly many configuration settings of a computer or server that together comprise a configuration status. Target configurations are configurations of a work unit that have been identified as configurations that may be used to manufacture an incoming order.

Program logic 150 further reads rules 210. The rules 210 may be provided by a user or may reside on a file that is read by program logic 150. The rules are used to determine how to match the work unit 122 with one or more target configurations. A rule may take various forms. In one embodiment of the present invention, a rule is a text string that includes an if-portion defining criteria that must be met by the work unit 122 and a then-portion that identifies one or more target configurations in target configurations 220 as a match 230.

An if-portion may define a configuration item (such as a part number), an inventory data item (such as a quantity value), a demand data item (such as a forecasted demand value) and a manufacturing strategy item (such as a percentage match value). An if-portion may also include an on/off indicator that defines whether the rule is currently activated and/or dates during which the rule is activated.

In short, rules 210 are a set of statements that, if true, produce a match 230 with one or more target configurations from set 220 (wherein each target configuration corresponds to an incoming order from set 250). That is, any work unit that meets the criteria of the if-portion of a rule produces a match with the identified target configuration(s) in the then-portion of the rule. In one embodiment of the present invention, the if-portion is specified by listing one or more attribute values that, if present in a work unit, produce a match. An attribute value may be specified in a positive manner, wherein the existence of the specified attribute value produces a match. For example, an if-portion that specifies a "model number=550" would produce a match with a work unit having a model number of 550. Alternatively, an attribute value may be specified in a negative manner, wherein the lack of the specified attribute value produces a match. For example, an if-portion that specifies a "model number=NOT 550" would produce a match with a work unit having a model number of 770. Further, attribute values may be specified in a range such that any attribute value that falls within that range produces a match. For example, an if-portion that specifies a "500<model number<700" would produce a match with a work unit having a model number of 600. Additionally, attribute values may be specified using a wildcard. For example, an if-portion that specifies a "model number=6**" would produce a match with a work unit having a model number 655.

Since there are multiple rules 210, various matches may occur. In this case, an algorithm may be used to determine which one of multiple matching target configurations rules is used. Once a match 230 is made after execution of the rules 210 upon the read data (202, 204, 206, 208, 250 and 220), the reconfiguration process 240 is initiated. The reconfiguration process 240 involves the reconfiguration of the work unit 122 into one or more target configurations identified in the match 230, thereby facilitating the fulfillment of at least one incoming order 250.

FIG. 3 is a chart depicting an example of general rules used in rule set 210, according to one embodiment of the present invention. The rules depicted in the chart of FIG. 3 may be executed by routing processing and manufacturing system 106 using program logic 150. The chart of FIG. 3 shows a list of rules wherein each row represents a single rule. Each column of a single row represents an attribute that is evaluated when the rule is executed. The designator "FROM" refers to a work unit configuration 202 while the designator "TO" refers to a target configuration 220 of an incoming order 250.

Column 302 of a rule of the chart of FIG. 3 defines the part number or designator of a work unit configuration, column 304 defines a machine type of a work unit configuration and column 306 defines the model number of a work unit configuration. Column 308 defines the part number or designator of a target configuration, column 310 defines a machine type of a target configuration and column 312 defines the model number of a target configuration. Column 314 defines whether a specific rule is active, column 316 defines the relative priority of a specific rule and column 318 defines whether the rule is applied to the work unit configuration as a whole (system level) or applied to the work unit configuration of the components (unit level).

In general, a rule of the chart of FIG. 3 is executed by evaluating the attributes of a selected work unit configuration and comparing them to the attributes in columns 302-306 and evaluating the attributes of a selected target configuration and comparing them to the attributes in column 308-312. Also evaluated and possibly acted upon during rule execution are the active attribute in column 314, the relative priority level in column 316 and the system/unit indicator in column 318. If the attributes in the selected work unit configuration and the selected target configuration match the attributes in columns 302-312, respectively, and the factors of column 314-318 allow, then the rule results in a match between the selected work unit configuration and the selected target configuration. This results in a recommendation that the work unit configuration is reconfigured to the selected target configuration.

FIG. 4 is a chart depicting an example of rules used in rule set 210 to sort work units according to various factors, according to one embodiment of the present invention. The rules depicted in the chart of FIG. 4 may be executed by routing processing and manufacturing system 106 using program logic 150 in conjunction with other rules described in this specification. The chart of FIG. 4 shows a list of rules wherein each row represents a single rule. Each column of a single row represents an attribute that is evaluated when the rule is executed.

Like the chart of FIG. 3, column 402 of the chart of FIG. 4 defines a part number of a work unit configuration, column 404 defines a machine type and column 406 defines the model number. Column 408 defines the part number or designator of a target configuration, column 410 defines a machine type and column 412 defines the model number. Column 414 defines an age for the work unit configuration, column 416 defines a forecasted demand indicator for the target configuration and column 418 defines a short part indicator that indicates whether to determine if there is a demand for certain parts (i.e., short parts) in the work unit configuration. Column 420 defines a location for the work unit configuration, column 422 defines a shift that shall execute the current rule and column 424 defines an asset disposition indicator that indicates a desired action when a "work unit configuration/target configuration" pair does not meet the priority indicators that are defined in columns 414-422 (an INCLUDE indicator indicates that the corresponding "work unit configuration/target configuration" pair results in a match, while an EXCLUDE indicator indicates that the "work unit configuration/target configuration" pair does not produce a match). During execution of a rule, the attributes of columns 414-424 sort "work unit configuration/target configuration" pairs according to age, forecasted demand, short parts, stocked location and shift, as a method to both exclude specific classes of configurations from consideration, and also to prioritize specific classes of configurations for primary consideration.

Like the rules of FIG. 3, if the attributes in the selected work unit configuration and the selected target configuration match the attributes in columns 402-412, respectively, and the factors of column 414-424 allow, then the rule results in a match between the selected work unit configuration and the selected target configuration. This results in a recommendation that the work unit configuration is reconfigured to the selected target configuration.

FIG. 5 is a chart depicting an example of rules used in rule set 210 to sort work units according to non-component data, according to one embodiment of the present invention. The rules depicted in the chart of FIG. 5 may be executed by routing processing and manufacturing system 106 using program logic 150 in conjunction with other rules described in this specification. The chart of FIG. 5 shows a list of rules wherein each row represents a single rule. Each column of a single row represents an attribute that is evaluated when the rule is executed.

Like the chart of FIG. 4, column 502 of the chart of FIG. 5 defines a part number of a work unit configuration, column 504 defines a machine type and column 506 defines the model number. Column 508 defines the part number or designator of a target configuration, column 510 defines a machine type and column 512 defines the model number.

Columns 514-522 must be met in order to produce a match. Column 514 defines an operational condition of a work unit (such as a testing status or a manufacturing status) and column 516 defines a product qualification of the work unit (such as an inspection status or a standard qualification status). Column 518 defines a production line area or location for the work unit, column 520 defines whether a quality hold is in place for the work unit configuration and column 522 defines a loaner status indicator for the work unit.

Columns 524-528 define attributes that, if true, do not produce a match. Column 524 defines a language indicator, column 526 defines a country indicator and column 528 defines a conditional use indicator. Columns 530-532 must be met in order to produce a match. Column 530 defines a time-to-ship indicator and column 532 defines an order class.

Like the rules of FIG. 4, if the attributes in the selected work unit configuration and the selected target configuration match the attributes in columns 502-512, respectively, and the factors of column 514-532 allow, then the rule results in a match between the selected work unit configuration and the selected target configuration. This results in a recommendation that the work unit configuration is reconfigured to the selected target configuration, thus providing a method to match configurations based on defined attributes.

FIG. 6 is a chart depicting an example of rules used in rule set 210 to sort work units according to sales data and part content, according to one embodiment of the present invention. The rules depicted in the chart of FIG. 6 may be executed by routing processing and manufacturing system 106 using program logic 150 in conjunction with other rules described in this specification. The chart of FIG. 6 shows a list of rules wherein each row represents a single rule. Each column of a single row represents an attribute that is evaluated when the rule is executed.

Like the chart of FIG. 5, column 602 of the chart of FIG. 6 defines a part number of a work unit configuration, column 604 defines a machine type and column 606 defines the model number. Column 608 defines the part number or designator of a target configuration, column 610 defines a machine type and column 612 defines the model number.

Column 614 defines an optimization indicator that defines whether the reconfiguration between the defined "work unit configuration/target configuration" pair shall be optimized. Column 616 defines whether a sales validation is required before reconfiguration and column 618 defines a sales percentage match that must be met before reconfiguration. Column 620 defines whether an item validation is required before reconfiguration and column 622 defines a minimum percentage match between components or parts of the "work unit configuration/target configuration" pair, wherein the minimum percentage must be met before reconfiguration. Column 624 defines a maximum percentage of parts removed during reconfiguration, wherein the percentage cannot be exceeded before reconfiguration is undertaken.

Like the rules of FIG. 5, if the attributes in the selected work unit configuration and the selected target configuration match the attributes in columns 602-612, respectively, and the factors of column 614-624 allow, then the rule results in a match between the selected work unit configuration and the selected target configuration. This results in a recommendation that the work unit configuration is reconfigured to the selected target configuration, thus providing the capability to match configurations based upon the relative likeness of the configurations.

FIG. 7 is a chart depicting an example of rules used in rule set 210 to sort work units according to sales data, according to one embodiment of the present invention. The rules depicted in the chart of FIG. 7 may be executed by routing processing and manufacturing system 106 using program logic 150 in conjunction with other rules described in this specification. The chart of FIG. 7 shows a list of rules wherein each row represents a single rule. Each column of a single row represents an attribute that is evaluated when the rule is executed.

Like the chart of FIG. 6, column 702 of the chart of FIG. 7 defines a part number of a work unit configuration, column 704 defines a machine type and column 706 defines the model number. Column 708 defines the part number or designator of a target configuration, column 710 defines a machine type and column 712 defines the model number.

Column 714 defines a feature code and column 716 defines a quantity that must be present in both work unit and incoming order in order for the rule to produce a match. Likewise, column 722 defines a bill of materials and column 724 defines a quantity that must be present in both work unit and incoming order in order for the rule to produce a match. Column 718 defines a feature code and column 720 defines a quantity that cannot be present in an incoming order in order for the rule to produce a match. Likewise, column 726 defines a bill of materials and column 727 defines a quantity that cannot be present in an incoming order in order for the rule to produce a match.

Like the rules of FIG. 6, if the attributes in the selected work unit configuration and the selected target configuration match the attributes in columns 702-712, respectively, and the factors of column 714-727 allow, then the rule results in a match between the selected work unit configuration and the selected target configuration. This results in a recommendation that the work unit configuration is reconfigured to the selected target configuration, thus providing the capability to specifically include or exclude certain matches based on specific content of the configuration(s).

FIG. 8 is a chart depicting an example of rules used in rule set 210 to sort work units according to manufacturing content, according to one embodiment of the present invention. The rules depicted in the chart of FIG. 8 may be executed by routing processing and manufacturing system 106 using program logic 150 in conjunction with other rules described in this specification. The chart of FIG. 8 shows a list of rules wherein each row represents a single rule. Each column of a single row represents an attribute that is evaluated when the rule is executed.

Like the chart of FIG. 7, column 802 of the chart of FIG. 8 defines a part number of a work unit configuration, column 804 defines a machine type and column 806 defines the model number. Column 808 defines the part number or designator of a target configuration, column 810 defines a machine type and column 812 defines the model number.

Column 814 defines a product identifier for the work unit while column 816 defines a bill of materials for the work unit. Column 818 defines a part or commodity number for the work unit, column 820 defines an operation indicator for the work unit and column 822 defines a placement indicator for the "work unit configuration/target configuration" pair. Column 824 defines an attribute required in the work unit in order for the rule to produce a match and column 826 defines whether a critical part in the work unit is necessary in order for the rule to produce a match.

Like the rules of FIG. 7, if the attributes in the selected work unit configuration and the selected target configuration match the attributes in columns 802-812, respectively, and the factors of column 814-826 allow, then the rule results in a match between the selected work unit configuration and the selected target configuration. This results in a recommendation that the work unit configuration is reconfigured to the selected target configuration, thus providing the capability to specifically include or exclude certain matches based on specific content of the configuration(s).

Figure 9:
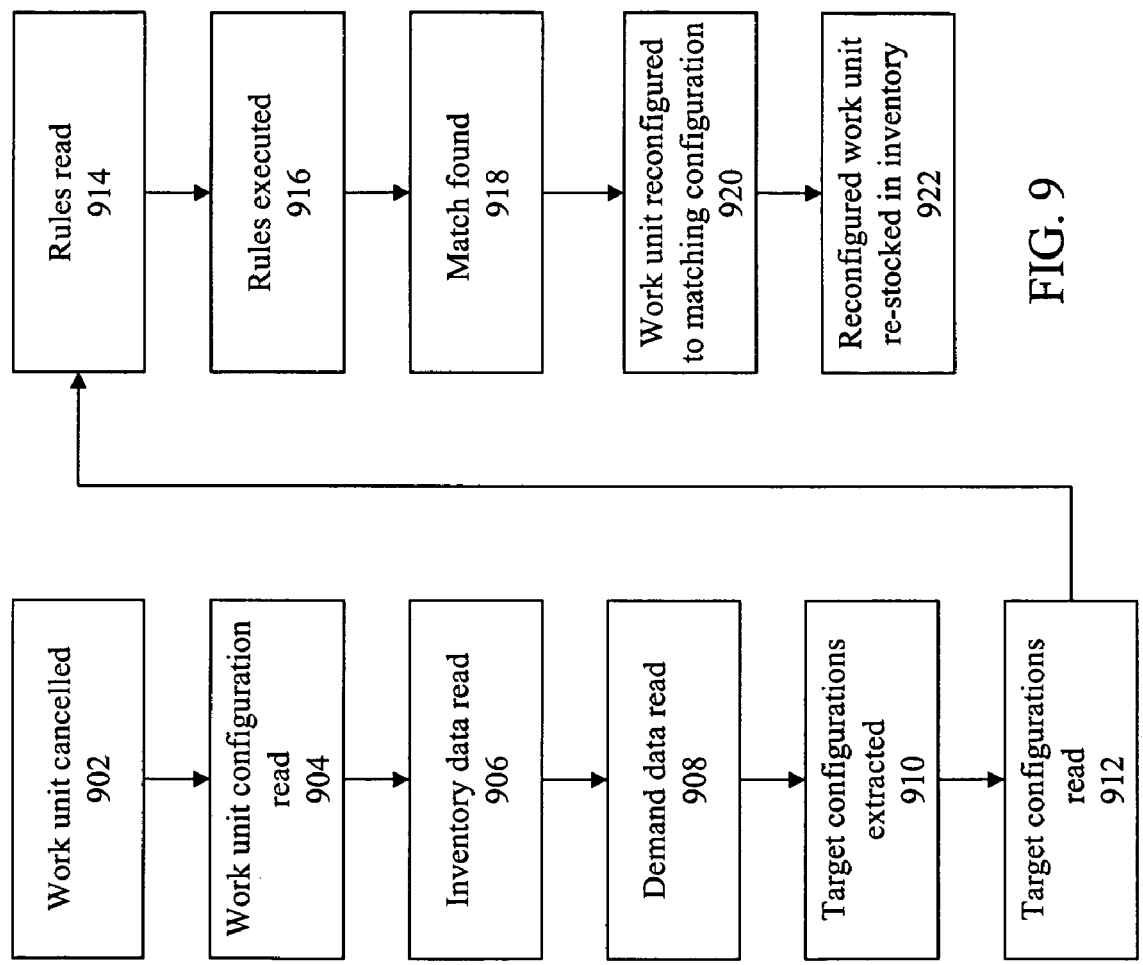
FIG. 9 is a flow chart depicting the control flow of an intelligent reconfiguration process executed during manufacturing, according to one embodiment of the present invention.

FIG. 9 is a flow chart depicting the control flow of an intelligent reconfiguration process executed during manufacturing, according to one embodiment of the present invention. The process of FIG. 9 may be executed by routing processing and manufacturing system 106 using program logic 150.

In block 902 the order behind a work unit 122 is cancelled and consequently the work unit 122 is removed form the manufacturing process and program logic 150 is executed. In block 904 the work unit configuration 202 of work unit 122 is read. In block 906 the inventory data 204 is read and in block 908 the demand data 206 is read. In block 910, the target configurations 220 are extracted from the incoming orders 250. In block 912 the target configurations 220 are read and in block 914 the rules 210 are read. The rules 210 may comprise any or all of the rules defined in the charts of FIGS. 3-8.

In block 916 the rules 210 are executed. Execution of the rules upon work unit configurations 202 and target configurations 220 comprises reading the if-portions defined in the rules 210 and searching for those values in the corresponding work unit configurations 202 and target configurations 220. Further, in one embodiment of the present invention, the least computationally intensive selection, sorting, and trimming of possible match candidates are executed initially, followed by the execution of the more computationally intensive detailed content matching being performed only upon this selective set. When matching values are found, then a rule is considered a match 230. In block 918 a match 230 is found. A record may be made of the match 230, such as a computer file or an entry in a database. Alternatively, the match 230 may be displayed to a computer display or printed onto paper.

In block 920, the reconfiguration process 240 is executed. The reconfiguration process 240 involves the reconfiguration of the work unit 122 into the target configuration(s) identified in the match 230. The work unit 122 is reconfigured by undergoing a reconfiguration process 108, thereby producing a reconfigured work unit 124, for restocking in inventory in block 922, which is used to fulfill an existing incoming order 205. Thus, the work unit 122 is re-entered into the manufacturing process 106 for reconfiguration.

In one alternative embodiment of the rule execution step 916, the rules 210 are executed upon the work unit configuration 202 as a whole. If no match is found, then the rules 210 can be executed upon the configurations of the components or sub-portions of the work unit 122 so as to match the configurations of the components with one of a target configurations 220 of the at least one incoming order 220. If a match is found, then a re-configuration of at least one component of the work unit 122 is initiated so as to reconfigure the component to the target configuration with which it was matched.

Embodiments of the present invention are advantageous of the prior art because they allow for the automated reconfiguration of cancelled built-to-order work units so as to reuse the work unit in the manufacturing process. This feature increases reuse of work units and parts, thereby reducing waste, reducing expenditures and increasing resource availability. The process further lowers costs associated with complete disassembly of a cancelled work unit and minimizes the unavailability of parts used in a partially manufactured product.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for reconfiguring a partially manufactured product for a canceled custom-built order during a manufacturing process, comprising:
    canceling a custom-built order for a product that has been partially manufactured;
    reading a configuration of the partially manufactured product for the custom-built order that has been canceled;
    reading at least one order for a different manufactured product, wherein each order is associated with a target configuration;
    reading a set of rules that match a given configuration with one of a set of target configurations;
    executing the set of rules upon the configuration of the partially manufactured product so as to match the configuration of the partially manufactured product with one of a target configuration of the at least one order; and
    initiating re-configuration of the partially manufactured product to the target configuration with which it was matched to produce the different manufactured product corresponding to the at least one order in lieu of the custom-built order that had been canceled.

2. The method of claim 1, wherein reading a configuration further comprises:
    reading a configuration of the partially manufactured product, wherein a configuration comprises a set of configuration attributes.

3. The method of claim 2, wherein reading a set of rules further comprises:
    reading a set of rules that match a given configuration with one of a set of defined target configurations, wherein a rule comprises an if-portion that defines a set of configuration attributes and a then-portion that identifies a target configuration.

4. The method of claim 3, wherein reading a set of rules further comprises:
    reading inventory data of the manufacturing process; and
    reading a set of rules that match a given configuration with one of a set of defined target configurations, wherein a rule comprises an if-portion that defines a set of configuration attributes and inventory data and a then-portion that identifies a target configuration.

5. The method of claim 3, wherein reading a set of rules further comprises:
    reading demand data of the manufacturing process; and
    reading a set of rules that match a given configuration with one of a set of defined target configurations, wherein a rule comprises an if-portion that defines a set of configuration attributes and demand data and a then-portion that identifies a target configuration.

6. The method of claim 3, wherein executing the set of rules further comprises:
    comparing the configuration attributes of the configuration of the partially manufactured product with the configuration attributes of the if-portion of each rule.

7. A computer program product comprising a computer usable storage medium storing computer usable program code for reconfiguring a partially manufactured product during a manufacturing process, the computer program product comprising:
    computer usable program code for canceling a custom-built order for a product that has been partially manufactured;
    computer usable program code for reading a configuration of the partially manufactured product for the custom-built order that has been canceled;
    computer usable program code for reading at least one order for a different manufactured product, wherein each order is associated with a target configuration;
    computer usable program code for reading a set of rules that match a given configuration with one of a set of target configurations;
    computer usable program code for executing the set of rules upon the configuration of the partially manufactured product so as to match the configuration of the partially manufactured product with one of a target configuration of the at least one order; and
    computer usable program code for initiating re-configuration of the partially manufactured product to the target configuration with which it was matched to produce the different manufactured product corresponding to the at least one order in lieu of the custom-built order that had been canceled.

8. The computer program product of claim 7, wherein the computer usable program code for reading a configuration further comprises:
    computer usable program code for reading a configuration of the partially manufactured product, wherein a configuration comprises a set of configuration attributes.

9. The computer program product of claim 8, wherein the computer usable program code for reading a set of rules further comprises:
    computer usable program code for reading a set of rules that match a given configuration with one of a set of defined target configurations, wherein a rule comprises an if-portion that defines a set of configuration attributes and a then-portion that identifies a target configuration.

10. The computer program product of claim 9, wherein the computer usable program code for reading a set of rules further comprises:
    computer usable program code for reading inventory data of the manufacturing process; and
    computer usable program code for reading a set of rules that match a given configuration with one of a set of defined target configurations, wherein a rule comprises an if-portion that defines a set of configuration attributes and inventory data and a then-portion that identifies a target configuration.

11. The computer program product of claim 9, wherein the computer usable program code for reading a set of rules further comprises:
    computer usable program code for reading demand data of the manufacturing process; and
    computer usable program code for reading a set of rules that match a given configuration with one of a set of defined target configurations, wherein a rule comprises an if-portion that defines a set of configuration attributes and demand data and a then-portion that identifies a target configuration.

12. The computer program product of claim 9, wherein the computer usable program code for executing the set of rules further comprises:
    computer usable program code for comparing the configuration attributes of the configuration of the partially manufactured product with the configuration attributes of the if-portion of each rule.

13. A method for reconfiguring a partially manufactured product during a manufacturing process, comprising:
- canceling a custom-built order for a product that has been partially manufactured;
- reading a configuration of the partially manufactured product for the custom-built order that has been canceled and a configuration for components of the partially manufactured product for the custom-built order that has been canceled;
- reading at least one order for a different manufactured product, wherein each order is associated with a target configuration;
- reading a set of rules that match a given configuration with one of a set of target configurations;
- executing the set of rules upon the configuration of the partially manufactured product so as to match the configuration of the partially manufactured product with one of a target configuration of the at least one order;
- determining that the configuration of the partially manufactured product does not match one of a target configuration of the at least one order;
- executing the set of rules upon the configurations of the components of the partially manufactured product so as to match the configurations of the components with one of a target configuration of the at least one order; and
- initiating re-configuration of at least one component of the partially manufactured product to the target configuration with which it was matched to produce the different manufactured product corresponding to the at least one order in lieu of the custom-built order that had been canceled.

14. The method of claim 13, wherein reading a configuration further comprises:
- reading a configuration of the partially manufactured product, wherein a configuration comprises a set of configuration attributes.

15. The method of claim 14, wherein reading a set of rules further comprises:
- reading a set of rules that match a given configuration with one of a set of defined target configurations, wherein a rule comprises an if-portion that defines a set of configuration attributes and a then-portion that identifies a target configuration.

16. The method of claim 15, wherein reading a set of rules further comprises:
- reading inventory data of the manufacturing process; and
- reading a set of rules that match a given configuration with one of a set of defined target configurations, wherein a rule comprises an if-portion that defines a set of configuration attributes and inventory data and a then-portion that identifies a target configuration.

17. The method of claim 15, wherein reading a set of rules further comprises:
- reading demand data of the manufacturing process; and
- reading a set of rules that match a given configuration with one of a set of defined target configurations, wherein a rule comprises an if-portion that defines a set of configuration attributes and demand data and a then-portion that identifies a target configuration.

18. The method of claim 15, wherein first step of executing the set of rules further comprises:
- comparing the configuration attributes of the configuration of the partially manufactured product with the configuration attributes of the if-portion of each rule.

19. The method of claim 18, wherein second step of executing the set of rules further comprises:
- comparing the configuration attributes of the configurations of the components with the configuration attributes of the if-portion of each rule.

* * * * *